United States Patent [19]

Allaire et al.

[11] Patent Number: 5,024,978
[45] Date of Patent: Jun. 18, 1991

[54] COMPOSITIONS AND METHODS FOR MAKING CERAMIC MATRIX COMPOSITES

[75] Inventors: Roger A. Allaire, Big Flats; Mark S. Friske; Sandra L. Hagg, both of Corning; Victor F. Janas, Horseheads, all of N.Y.

[73] Assignee: Corning Incorporated, Corning, N.Y.

[21] Appl. No.: 358,589

[22] Filed: May 30, 1989

[51] Int. Cl.⁵ .................... C04B 35/02; C04B 35/08
[52] U.S. Cl. ........................ 501/95; 501/94; 264/63
[58] Field of Search ............ 501/89, 95, 32; 264/63, 264/64, 65, 66

[56] References Cited

U.S. PATENT DOCUMENTS

| | | | |
|---|---|---|---|
| 4,314,852 | 2/1982 | Brennan et al. | 501/88 |
| 4,379,109 | 4/1983 | Simpson | 264/60 |
| 4,412,854 | 11/1983 | Layden | 65/18.1 |
| 4,558,699 | 5/1986 | Brennan et al. | 501/9 |
| 4,581,053 | 4/1986 | Prewo et al. | 65/4.21 |
| 4,585,500 | 4/1986 | Minjolle et al. | 156/89 |
| 4,615,987 | 10/1986 | Chyung et al. | 501/8 |
| 4,696,710 | 9/1987 | Minjolle et al. | 264/63 |

*Primary Examiner*—William R. Dixon, Jr.
*Assistant Examiner*—Alan Wright
*Attorney, Agent, or Firm*—K. van der Sterre

[57] ABSTRACT

Fiber-reinforced ceramic matrix composite articles are fabricated by combining inorganic reinforcing fibers with dispersions of powdered ceramic matrix materials in organic vehicles which are thermoplastic solids. The dispersions are solid at room temperature, and are melted and combined with the fibers as heated liquid dispersions. Following application to the fibers, the thermoplastic dispersions are solidified by simple cooling; no solvent removal or drying step is required.

14 Claims, 1 Drawing Sheet

COMPOSITIONS AND METHODS FOR MAKING CERAMIC MATRIX COMPOSITES

BACKGROUND OF THE INVENTION

The present invention relates to ceramic matrix composites, and to methods for the manufacture thereof. More particularly, the invention relates to an improved method for manufacturing preforms for ceramic matrix composites wherein novel binder materials are used.

Ceramic matrix composites are well known. Typically they comprise a ceramic matrix material such as a glass, a glass-ceramic, or a crystalline ceramic material forming a matrix wherein refractory inorganic fibers are disposed as a reinforcing phase. A number of U.S. Pats. show the structure and manufacture of such composites, including, for example, U.S. Pat. Nos. 4,314,852, 4,588,699 and 4,615,987.

In conventional practice, composites incorporating ceramic matrix materials are manufactured from powders of the selected matrix or a matrix precursor, with the fibers being combined with the powders and consolidated to dense composite materials by the application of heat and pressure. To provide a homogeneous distribution of the fibers in the matrix the powders are generally first dispersed in a liquid vehicle. This liquid is then applied to the fibers as a coating or, in the case of short fibers, the fibers are added to the liquid and dispersed.

Conventional dispersions of matrix powders in liquid vehicles comprise, in addition to the powdered matrix itself, various dispersing agents, binders, and solvents which are needed to stabilize the dispersion and impart to the dispersion the properties of rapid drying and at least some flexibility after drying has occurred. Plasticizers to enhance flexibility may also be included.

Suspensions such as conventionally employed for these processes must be carefully formulated, handled, and stored in order to be effectively used. The powdered ceramics tend to settle in the suspensions and continuous mixing is normally required to maintain homogeneity therein. Stabilization of the suspensions against viscosity changes, which can occur during storage or use of these suspensions, may be required to avoid undesirable changes in the coating or fiber impregnation characteristics of the suspension.

Referring to specific ceramic suspensions known to the art, U.S. Pat. No. 4,412,854 discloses the manufacture of a fiber-reinforced composite preform from a suspension of a glass powder in vehicle comprising a thermoplastic polymeric binder, typically an acrylic polymer binder. The binder is dispersed or dissolved in a carrier liquid and powdered matrix material is added. The resulting liquid suspension is combined with a woven or non-woven fiber reinforcement which is then dried and optionally reshaped prior to consolidation.

U.S. Pat. No. 4,588,699 illustrates the use of an aqueous system wherein latex is employed as a binder, and also a solvent-based system wherein the matrix is simply dispersed in a liquid carrier of propanol.

More complex suspension systems are disclosed in U.S. Pat. No. 4,585,500, wherein a synthetic resin is dispersed in a solvent for the resin prior to the introduction of the powdered matrix material. The system further includes components such as paraffin wax, a plasticizer and a surfactant to act as dispersion and stabilization aids and to impart flexibility to the resulting preform. As in most matrix suspensions used for fiber-reinforced composites, the liquid components must generally be removed by evaporation from the fiber/matrix intermediate in order to provide a dry preform which can be handled, and plasticizing components are frequently helpful to retain at least some flexibility in the fiber/matrix assembly after drying.

Typical proportions of ingredients in these suspensions, as suggested by U.S. Pat. No. 4,581,053, are 20–50% by weight of matrix powder, 10–20% by weight of a polymeric binder, and the balance a carrier liquid. Components such as dispersing agents or the like are typically added in more minor amounts.

Notwithstanding the fact that a variety of different suspensions and techniques have been used for coating or otherwise combining reinforcing fibers with matrix materials, there remains a need for an improved coating system which will avoid the several problems of solvent-based systems presently being used for ceramic matrix composite manufacture. Improved suspension stability, better drying characteristics, and enhanced preform handling behavior are all needs which could be usefully addressed.

It is therefore a principal object of the present invention to provide improved matrix dispersions for the manufacture of ceramic matrix composites which will avoid certain of the shortcomings of prior art suspensions.

It is a further object of the invention to provide a method for manufacturing ceramic matrix composites which employs a dispersion of ceramic matrix powders in a thermoplastic vehicle to more effectively and efficiently impregnate or coat reinforcing fibers with such powders.

It is a further object of the invention to provide preforms or prepregs comprising combinations of ceramic matrix and reinforcing fiber materials, and methods making them, offering significant improvements in the handling and subsequent processing characteristics of the preforms or prepregs.

Other objects and advantages of the invention will become apparent from the following description.

SUMMARY OF THE INVENTION

The present invention is based on a recognition that many of the problems encountered in the manufacture of ceramic matrix composites in the prior art may by overcome through the use of a thermoplastic vehicle or carrier for the powdered matrix. This vehicle is an organic thermoplastic vehicle which is a room temperature solid and, preferably, essentially solvent-free.

While the prior art has utilized thermoplastic polymers as ingredients in liquid suspensions of matrix materials to be applied to or combined with fiber reinforcement for the fabrication of such composites, such use did not overcome the problems of matrix settling, slow drying, and relatively low preform flexibility inherent in such suspensions. More importantly, no significant advantage was taken of the thermoplastic melt transition behavior of those organic polymer binders or other additives which were employed.

In the practice of the invention the basic steps of ceramic matrix composite manufacture, including combining a fiber reinforcement material with a suspended powdered ceramic matrix material, are followed. However, because the ceramic matrix dispersion is a dispersion of the powder in a normally solid thermoplastic vehicle, and is itself a room temperature solid, it is handled as a hot melt material. Thus the dispersion is heated above the melt transition temperature of the thermoplastic vehicle to convert it to liquid form, and is applied as a heated liquid to the inorganic fibers.

Advantageously, because the thermoplastic dispersion as applied to the fibers is typically substantially free of water or other liquid solvent materials, it can be rapidly solidified on or within the fibers simply by cooling. Thus there is no need for a separate drying treatment to volatilize constituents of the dispersion. Moreover, the solidified fiber-matrix preform is generally flexible and durable as well as amenable to substantial reshaping by the application of only moderate heat and pressure.

In one important aspect, then, the invention resides in an improvement in the conventional method for making a fiber-reinforced ceramic matrix composite article by combining a dispersion of powdered ceramic matrix material with reinforcing fibers and thereafter consolidating the ceramic powder and fibers to form the composite ceramic article. In accordance with that improvement, the dispersion is a room temperature solid comprising a powdered ceramic matrix material dispersed in a thermoplastic organic vehicle.

For combining with the fibers the solid dispersion is first heated to an elevated temperature above the melt transition temperature but below the thermal decomposition temperature of the thermoplastic vehicle, the latter temperature being the lowest temperature at which significant decomposition or volatilization of vehicle components will occur. The hot dispersion is then applied as a liquid to the reinforcing fibers, and is thereafter solidified by cooling and without drying, i.e., without significant volatilization of any of the components of the dispersion.

In a second aspect the invention may be seen as a ceramic powder dispersion offering improved fiber application characteristics for the manufacture of fiber-reinforced ceramic matrix composites. The ceramic powder dispersion comprises a powdered ceramic matrix material dispersed in a thermoplastic organic vehicle, both the organic vehicle and the dispersion being solids at room temperature (i.e., at 25° C.). The thermoplastic organic vehicle will have a melt transition temperature below its decomposition temperature, and will be present in a proportion such that the dispersion can be transformed into a flowable liquid by heating.

The melting of the dispersion to a flowable liquid will occur at a temperature below the thermal decomposition temperature of the organic vehicle. In this way the dispersion can be applied as a melted liquid to the selected fiber reinforcement material without undesirable decomposition or changes in vehicle properties.

The powdered ceramic material in the dispersion is selected from the group consisting of glasses, crystallizable glasses, and crystalline ceramics. The flow characteristics of the dispersions will of course vary depending upon the loading of powder therein. However, dispersions containing as little as 20–25% by volume ceramic powder or as much as 70% by volume of ceramic powder are known to be useful, and higher or lower powder loadings may be useful for selected applications.

In composition, the thermoplastic vehicle will generally comprise one or more thermoplastic resin components and one or more heat-softening wax components, these components being present in proportions formulated to impart vehicle compatibility with powdered ceramic matrix materials, dispersion lubricity, good melt flow behavior, and flexibility in the solid dispersion following incorporation thereof into a composite prepreg.

In yet another aspect, the invention resides in a novel preform for a fiber-reinforced ceramic composite article, the preform including a matrix comprising a solid dispersion of ceramic powder in a thermoplastic vehicle and a reinforcing phase consisting of a multiplicity of inorganic fibers distributed in that matrix. Advantageously, the preform can readily be reshaped or reformed, without excessive damage to the fibers, by first heating the preform to a temperature in the region of the melt transition temperature of the solid ceramic dispersion.

As is apparent from the above description, the invention offers numerous advantages over the use of conventional dispersions of matrix materials, including the absence of ceramic powder settling in the dispersion, better adherence of the dispersion to the fiber materials, rapid solidification of the dispersion coating, and good handling and reforming characteristics in the solidified preform. In addition, the viscosity of the matrix dispersion can be conveniently controlled with temperature, and thermoplastic vehicle formulations which can be readily removed without residue in non-oxidizing as well as oxidizing thermal treatments can be employed. This latter characteristic is particularly desirable where the avoidance of fiber or matrix oxidation during consolidation is required.

DESCRIPTION OF DRAWING

The invention may be further understood by reference to the drawing wherein.

DETAILED DESCRIPTION

Figure 1:
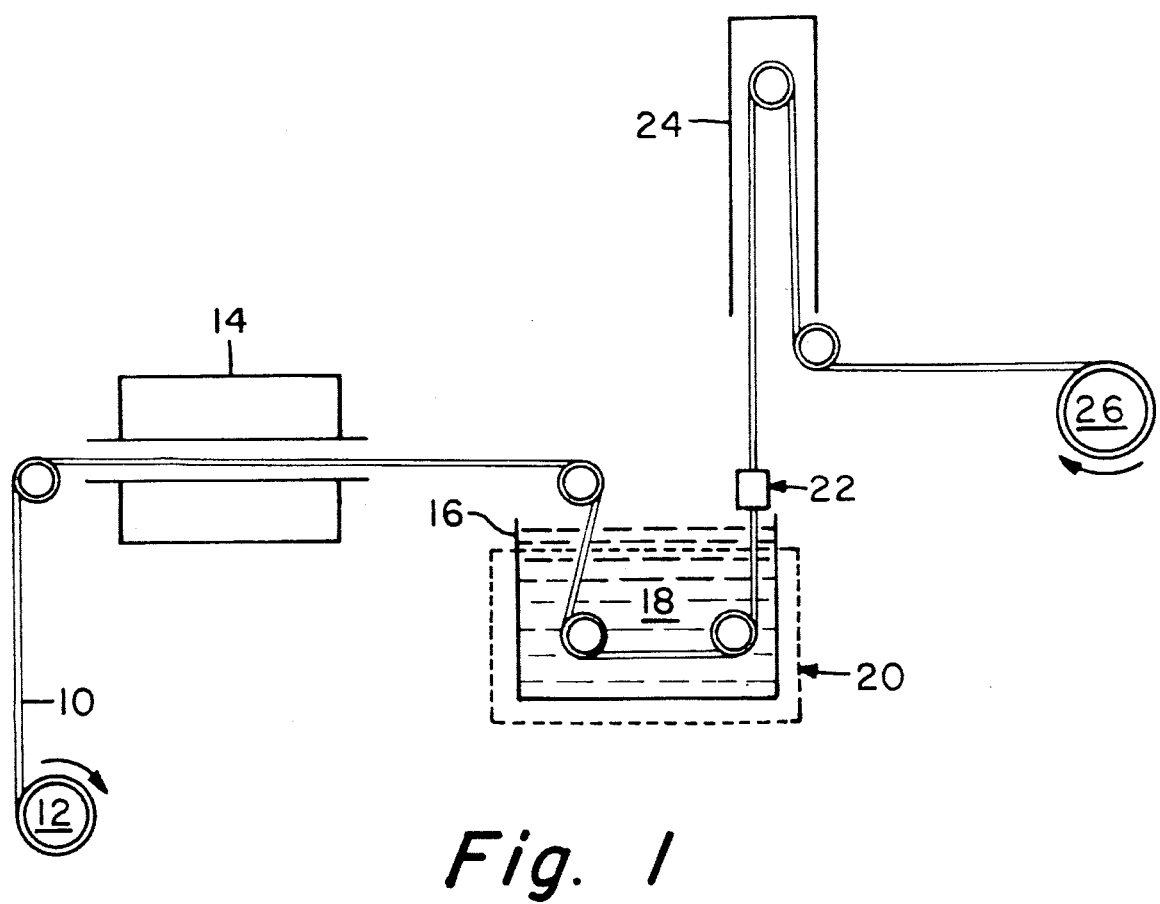
FIG. 1 schematically illustrates apparatus useful for the manufacture of ceramic matrix composite articles in accordance with the invention.

As will now be evident, the invention is not limited to the use of any particular ceramic matrix material. Rather any of the known ceramic materials which have been employed for the manufacture of composite products in the prior art may be used. These include powdered glasses, such as powdered aluminosilicate glasses or powdered borosilicate glasses, powdered aluminosilicate glasses which are thermally crystallizable to yield refractory glass-ceramic matrices such as matrices comprising $\beta$-spodumene, anorthite, cordierite, or other phases therein, and crystalline materials useful for composite manufacture such as, for example, alumina, zirconia, silicon carbide, silicon nitride, and other materials.

Likewise, the invention is not limited in its application to the use of any particular reinforcing fibers. Rather, a variety of fibers including those selected from the group comprising fibers of carbon, silicon carbide, glass, silicon nitride, alumina, mullite or similar materials may be used.

In selecting inorganic fibers for use in accordance with the invention, the physical form in which the fibers are used may be chosen according to the requirements of subsequent processing or the configuration or properties desired in the composite preform or end product. Thus, for example, the fibers may be provided in the form of a woven or non-woven fiber fabric, as where preforms or products of sheet configuration are desired. Alternatively, fiber tows, i.e., fiber bundles or other groups of fibers forming multi-fiber yarns, cords or twine can be selected and, surprisingly, are amenable to efficient and complete impregnation with thermoplastic dispersions of ceramic matrix materials as hereinafter described.

A number of different organic thermoplastic formulations may be employed to provide thermoplastic vehicles in accordance with the present invention. Generally, however, the selected thermoplastic vehicle will comprise at least one thermoplastic organic polymer component and at least one heat softening wax component as the principal constituents. The thermoplastic organic polymer components will be included in an aggregate proportion effective to impart flexibility and strength to the composite prepreg, a proportion typically ranging about 10-40% by weight of the vehicle. The wax components, preferably volatile low-melting waxes are hereinafter more particularly described, are added in an aggregate proportion sufficient to reduce the viscosity of the melted vehicle to a useful degree, that proportion typically ranging about 35-90% by weight of the vehicle. Preferably, the thermoplastic organic polymer and wax components of the vehicle will make up at least 60% of the vehicle weight.

Additional components may also be added to the vehicle formulation to make up the remainder (i.e., 0-40% by weight thereof). These may facilitate blending of the thermoplastic ceramic preparation by promoting dispersion of the powdered ceramic in the vehicle, or they may function to modify the application or room temperature properties of the dispersion itself. Examples of such optional constituents include surface-active dispersants and polymeric plasticizers. Other examples comprise other waxes including monolaurate waxes and fatty ketone waxes, as hereinafter more fully described.

Particularly preferred thermoplastic vehicle formulations for use in the present invention, disclosed in co-pending commonly assigned patent application Ser. No. 07/358,571 filed concurrently herewith by R. E. Johnson et al. as well as in working examples hereinafter set forth, are thermoplastic vehicle compositions exhibiting the characteristics of reversible gels. These gelling vehicles exhibit a rapid transition from a fluid state to a gelled, tack-free state on cooling, even at temperatures above the melt point or crystallization temperature of the low-melting wax components present in the vehicles.

For the manufacture of ceramic matrix composites, then, these vehicles offer the advantage that only moderate cooling is required to induce gelling and nearly complete loss of surface tackiness in fiber reinforcement comprising the applied ceramic dispersion. Thus rapid processing and collection of fiber prepreg materials incorporating such suspensions can be achieved without undesirable sticking of the collected material.

The thermoplastic organic polymer components preferred for use in the formulations of the aforementioned copending patent application are also suitable for use in accordance with the present invention. Typically, these are high molecular weight polymers imparting gelling properties to the vehicle. They may consist of essentially any wax-miscible polymer which will disperse or dissolve in molten wax and form a gel in the wax upon cooling. However, the preferred polymers include crystalline polymers such as ultrahigh molecular weight polyethylene (UHMWPE), polyethylene/acrylic copolymers such as ethylene/acrylic acid, acrylic copolymers such as butyl methacrylate/acrylic acid copolymers, and thermoplastic elastomers such as styrene tri-block copolymers.

The volatile low-melting waxes useful in accordance with the aforementioned copending patent application are also suitable for use in accordance with the present invention, and are characterizable as fatty alcohol, fatty acid, fatty glycol, and fatty glyceride waxes, i.e., waxes comprising these compounds or esters thereof, which are crystalline solids at room temperature and have melting points not exceeding about 80° C. Low molecular weight paraffinic waxes may also be employed, although they exhibit somewhat lower volatility than the non-paraffinic waxes mentioned.

The preferred waxes are waxes comprising wax molecules of 14-20 carbon atoms and most preferably consist of 14-18 carbon fatty alcohol waxes. These waxes exhibit relatively rapid volatilization at temperatures above about 140° C. at standard pressure and even more rapid volatilization under vacuum.

As earlier noted, the characteristic feature of the thermoplastic vehicles and ceramic dispersions of the invention is that they are solids at room temperature, i.e., at temperatures of 25° C. and below. Nevertheless, it will be apparent from this description that volatile solvents or other liquid constituents may be used as temporary expedients during the formulation and preparation of some of the inventive vehicles and dispersions. For example, solvents may be used to facilitate blending or other processing of the dispersion.

In all cases, however, it is preferred that volatile constituents be largely removed from the dispersions before they are stored and later used for composite manufacture. In this way, the dispersions as applied to the selected inorganic reinforcing fibers will be sufficiently free of water, organic solvents, and other volatile liquid components that the solidification of the dispersions on cooling to room temperature will be rapid and complete.

A further important characteristic of thermoplastic vehicle formulations to be utilized in accordance with the present invention is that they are removable from the preform for the ceramic matrix composite by heat vaporization without the formation of significant carbon residues. Most preferably, the thermoplastic vehicle can be volatilized without the formation of residual elemental carbon by heating the composite preform in an inert atmosphere. This characteristic is particularly valuable where reinforcing fibers which may be damaged by high temperature oxidation are to be incorporated in the preform.

The vehicle removal process in preforms comprising these vehicles involves the direct vaporization of the low-melting wax components of the vehicle, followed by the degradation of higher molecular weight waxes and polymers into lower molecular weight by-products which can then be vaporized without further decomposition. The above-described thermoplastic organic polymer and wax components preferred for use in accordance with the invention generally provide this desirable characteristic of carbon-free volatilization under inert "burnout" conditions.

The procedure for fabricating a ceramic matrix composite article utilizing a thermoplastic ceramic dispersion in accordance with the invention follows that employed in the prior art for the manufacture of similar products from conventional matrix suspensions. However, apparatus comprising means for the containment and application of hot melt ceramic dispersions to the fibers is preferably used.

If necessary, the selected reinforcing fibers are first conventionally pretreated to remove sizing or other foreign substances therefrom. Thereafter, the fibers are brought into contact with the thermoplastic dispersion in heated liquid form, typically by immersing the fibers in a heated reservoir of the dispersion and thereafter removing and cooling the coated fibers.

In accordance with preferred practice, the region surrounding the point of application of the thermoplastic matrix dispersion to the fibers will be heated, for example, to preheat the fibers and/or to avoid solidification of the applied dispersion before complete coating or impregnation of the fibers or fiber bundle can occur.

Following the coating step, rapid solidification of the applied dispersion is readily achieved. Thus, since the dispersion is substantially free of solvents and requires no separate drying or vaporization step, only cooling is needed to obtain a preform which can be handled or reshaped.

If desired, the coated or impregnated fibers are cooled relatively quickly after withdrawal from the thermoplastic melt and collected as coated fiber or impregnated fiber tow. Alternatively, the collection zone may be heated so that the collected fiber or tow may be preconsolidated into an integrally bonded mat or other preform.

Apparatus useful for the application of thermoplastic dispersions of ceramic matrix materials in accordance with the invention is schematically illustrated in FIG. 1 of the drawing. That figure consists of an elevational schematic view of such apparatus, not in true proportion or to scale, and includes for purposes of illustration a length of fiber as it could be transported through the apparatus in actual practice.

As shown in FIG. 1, a fiber tow or single fiber 10 is unwound from a fiber spool 12 and is transported via a pulley through a tube furnace 14. This tube furnace, which is optional, may be used if it is necessary or desirable to remove fiber sizing materials or other coatings from the fiber reinforcement by vaporization or oxidation prior to the application of the matrix dispersion thereto.

After passing through tube furnace 14, the fiber 10 next passes via another pulley into reservoir 16 which contains a quantity of heated thermoplastic matrix dispersion 18. Matrix dispersion 18 is maintained at a temperature above the melt transition temperature thereof by heating means for reservoir 16, which in the apparatus of the figure comprises an electrically powered oil bath heater 20, shown in outline. Oil bath heater 20, supplied by a conventional electrical power source not shown, contains a quantity of heated oil, also not shown. This oil is continuously heated in order to maintain dispersion 18 at a uniform elevated temperature.

After passing through molten thermoplastic matrix dispersion 18, fiber 10 is transported through a stripping die 22 which strips excess dispersion 18 from the surface of fiber 10. Stripping die 22 is desirably electrically heatable, for example by a conventional electrical power source not shown. Heating of die 22 may be useful in order that excessive cooling of fiber 10 comprising the coating or infusion of thermoplastic dispersion 18 will not occur while the fiber with thermoplastic dispersion is traversing the die.

Following transit through the stripping die 22, fiber 10 is transported via pulleys through a cooling tower 24 wherein the temperature of the surface of the coated fiber is lowered. Typically, the tower 24 will be sufficiently extended and sufficiently low in temperature that the coated fiber 10 exiting the tower will be sufficiently set to be essentially tack-free. That is, at least the surface of the thermoplastic matrix dispersion 18 on the fiber will have been cooled to a temperature below the melt transition temperature thereof.

After transport through the cooling tower, coated fiber 10 is finally collected on take-up reel 26. Due to the unique setting behavior of the thermoplastic matrix dispersion, the thus-coated fiber may at this stage be either stored as collected, or else rewound for use or storage in other form.

The invention may be further understood by reference to the following detailed examples illustrating the preparation and use of thermoplastic matrix dispersions and the manufacture of ceramic matrix composites in accordance therewith.

Example I (Ceramic Matrix)

A silicon carbide reinforcing fiber material suitable for incorporation into a ceramic matrix composite article is selected. This fiber is a Nicalon ® NLM-202 silicon carbide fiber tow, commercially available from the Nippon Carbon Company of Tokyo, Japan.

A dispersion of a powdered matrix material is compounded for application to the fiber tow, the dispersion comprising 70 volume percent of ceramic powder and 30 volume percent of a thermoplastic vehicle. The selected ceramic powder consists by weight of 35% $Si_3N_4$ and 65% of a mixture of titanium aluminide and aluminum boride.

The thermoplastic vehicle comprises approximately 15% by weight of Neocryl B700 acrylic thermoplastic polymer, commercially available from ICI Resins US of Wilmington, MA, 35% by weight of Alfol 18 synthetic fatty alcohol wax, 20% by weight of Alfol 16 synthetic fatty alcohol wax, 20% by weight of Grindtek ML-90 glycerol monolaurate wax, commercially available from Grindsted Products A/S of Brabrand, Denmark, 8.5% of Paracin 13 wax, commercially available from CasChem, Inc. of Bayonne, New Jersey, and 1.5% by weight of Stearone fatty ketone wax, commercially available from the Argus Chemical Corporation, Brooklyn, New York. The Alfol 18 and 16 waxes consist, respectively, of an octadecanol wax and a hexadecanol wax, these waxes being commercially available from the Vista Chemical Company of Houston, Texas.

The vehicle is compounded, prior to adding the ceramic powder thereto, by first mixing all of the polymer and wax constituents together at a temperature of approximately 80° C. Thereafter, a suspension of the powdered ceramic material consisting of 50% by weight of solids in an isopropanol vehicle is added to the heated wax/polymer mixture in a proportion sufficient to provide 70 volume % of ceramic powder and 30 volume % of thermoplastic vehicle in the final dispersion, the ceramic powder loading in the final dispersion constituting about 84% by weight. The powder slurry addition is accompanied by continued heating and mixing to insure volatilization of the solvent and the formation of a smooth, homogeneous dispersion of the ceramic powder in the thermoplastic vehicle is obtained. Heating is continued for a time sufficient to insure that any residual isopropanol is completely expelled from the dispersion, after which the dispersion is cooled to a solid and stored.

To provide a composite preform comprising silicon carbide fibers coated with the matrix dispersion thus provided, a continuous length of the selected fiber tow is unrolled from a drum and transported through a melt of the described matrix dispersion produced as described. The melted dispersion is maintained at a temperature of approximately 80° C. during application thereof to the fiber tow.

Following immersion in the dispersion, the treated fiber tow is removed and rapidly cooled to provide a tow comprising both a coating and an interstitial matrix phase of solidified ceramic matrix dispersion. The fiber tow with solidified matrix dispersion is then collected by winding on a rotating drum.

The treated fiber material thus collected is suitably incorporated into a ceramic matrix composite preform by simply cutting fiber lengths from the drum and forming the cut fiber lengths into a fiber-parallel array or lay-up. If desired, moderate heating and pressure may be applied at this stage to reform the array to a relatively dense composite prepreg.

To consolidate the prepreg thus provided, a two-stage process is used. The prepreg is first heated to an elevated binder removal temperature sufficient to remove the thermoplastic vehicle constituents from the preform by vaporization. This step is analogous to the "burnout" or debindering step typically employed to remove high molecular weight binders from ceramic matrix composite preforms in the prior art, although in the present case oxidation of the binder constituents is not required.

After removal of the vehicle by vaporization as described, the preform comprising silicon carbide fiber and ceramic matrix material is consolidated to a dense ceramic matrix composite by hot pressing at a temperature and pressure sufficient to substantially remove voids from the material. For this particular combination of fibers and ceramic powder, a peak temperature of about 1550° C. with application of a pressure of about 6000 psi are sufficient to achieve full consolidation.

The ceramic matrix composite article produced as described exhibits a microstructure which is of the same homogeneity and uniformity with respect to matrix infiltration as prior art composites of similar composition made with conventional binders. However, through the use of the thermoplastic binder of the invention, the manufacturing process is more controllable, preform handling is more convenient and flexible, and a product of excellent strength and fracture resistance is obtained.

Example II (Glass-ceramic Matrix)

A silicon carbide fiber tow is selected for use as a reinforcing fiber material for a ceramic matrix composite. The tow selected is Nicalon ® NLM-202 silicon carbide fiber tow, commercially available from the Nippon Carbon Company of Tokyo, Japan.

In preparation for the manufacture of a ceramic matrix composite product incorporating this fiber tow, a thermoplastic vehicle suitable for the application of a powdered glass matrix material to the tow is first prepared. This thermoplastic vehicle, which exhibits desirable rapid gelling behavior, comprises about 60 parts by weight of a fatty alcohol wax, about 20 parts by weight of a styrene-ethylene/butylene-styrene thermoplastic tri-block copolymer, about 20 parts by weight of a polybutene resin plasticizer, and about 0.4 parts by weight of a dispersant.

The wax used in the vehicle is Alfol TM 1418 DDB fatty alcohol wax blend, comprising a mixture of tetradecanol, hexadecanol, and octadecanol waxes and being commercially available from the Vista Chemical Company of Houston, Texas. The thermoplastic block copolymer used is Kraton TM G1650 thermoplastic elastomer, commercially available from the Shell Chemical Company of Houston, Texas. The plasticizer is Parapol 950 oil additive, commercially available from Exxon Chemicals of Houston, Texas, while the dispersant is Hypermer KD3 dispersing agent, commercially available from ICI Americas of Wilmington, Delaware.

To prepare the vehicle, all components except the block copolymer resin are weighed into a container and heated to 140° C. to melt the components together. The resin is then added to the molten mixture and all components are mixed with heating to about 167° C. until complete intermixing is obtained.

Using the vehicle thus provided, a matrix dispersion is prepared by adding powdered glass to the vehicle to form a dispersion or dispersion of the glass. The dispersion consists of about 50% by weight of aluminosilicate glass powder and the remainder thermoplastic vehicle by weight. The aluminosilicate glass is of calcium magnesium aluminosilicate composition and is thermally crystallizable on appropriate heat treatment to yield a glass-ceramic matrix comprising anorthite as the principal crystalline phase. The glass powder has an average particle size of about 10 microns.

After thorough mixing of the glass powder into the thermoplastic vehicle, the mixture is processed through a roller mill at about 140° C. to complete the blending of the glass and vehicle. The dispersion thus provided has a viscosity of approximately 2100 cps at 140° C. when tested for viscosity at a shear rate of 2.5 sec$^{-1}$. Further, substantially complete gelation of this dispersion occurs as it is cooled to a temperature of about 100° C.

The blended powdered glass dispersion produced as described is applied to the silicon carbide fiber tows by immersion coating of the fibers using apparatus such as shown in FIG. 1 of the drawing. A spool of the selected silicon carbide fiber tow is mounted on a spindle and the tow is drawn therefrom over a pulley and through a tube or burn-out furnace operating at a temperature of about 800° C. The sizing is removed from the silicon carbide fiber tow as it passes through this furnace, the transport rate of the fiber tow through the apparatus being about 10 ft/min.

The de-sized fiber tow exiting the furnace next passes into a heated reservoir of the thermoplastic dispersion of matrix powder produced as above described. The reservoir is heated by means of an oil bath heater having a set point temperature of about 200° C., this set point being sufficient to maintain the temperature of the dispersion in the reservoir at about 130°–140° C.

After passage through the thermoplastic matrix dispersion the fiber tow impregnated with the dispersion is drawn through a heated stripping die having an orifice diameter of approximately 0.035". The temperature of the die is maintained at approximately 125° C. to avoid cooling and setting the thermoplastic dispersion present on and within the fiber tow during the stripping process. The die orifice is selected simply to achieve a predetermined loading of matrix dispersion on the tow; larger or smaller dies may be substituted or the die may be dispensed with entirely.

After stripping the tow is passed upwardly through a vertical cooling tower to set the thermoplastic dispersion, and then down to a take-up reel where it is collected for later use. Due to the strong gelling behavior of the thermoplastic vehicle of this example, the set rate of the thermoplastic dispersion on the tow is sufficiently rapid that essentially no sticking of the impregnated fibers, either to the takeup spool or to adjacent fiber tows, is observed.

Figure 2:
FIG. 2 illustrates the distribution of fibers and matrix in a composite prepreg provided in accordance with the invention.

The degree to which full impregnation of a fiber tow by a powdered ceramic matrix material is achieved utilizing the foregoing procedure is illustrated by the photomicrograph constituting FIG. 2 of the drawing. That Figure consists of an enlarged cross-sectional view of an impregnated fiber tow produced generally as above described, and shows the presence of a multiplicity of irregularly shaped ceramic powder grains typified by Particle B distributed among an array of silicon carbide fibers represented by typical Fiber A. The white bar in the micrograph corresponds to a dimension of about 100 μm. As is evident from a study of that micrograph, a highly uniform distribution of the ceramic particles within the fiber array has been achieved.

A ceramic matrix composite product is suitably prepared from the prepreg fiber tow produced as described by a hot pressing procedure. The impregnated tow is cut to 3-inch lengths and laid flat to provide a prepreg layup wherein the fibers are all in substantially parallel alignment. The layup thus provided, having a thickness of about 0.04 inches and a width of about 1.5 inches, is preliminarily fused to an integral prepreg sheet by heating the assembly above the gel point of the thermoplastic binder.

Prepreg sheets produced as described are finally stacked and consolidated by hot pressing to provide ceramic matrix composite plates. After stacking but before final consolidation, vaporization of the thermoplastic binder from the stacks is first accomplished by heating them to a temperature of about 550° C. in a nitrogen atmosphere.

The resulting binder-free stacks are consolidated by heating to a peak consolidation temperature of about 1340° C., concurrently with the application of a consolidation pressure of about 1500 psi. These conditions of temperature and pressure are maintained for approximately 15 minutes, thus to achieve substantially void-free consolidation of the composite while at the same time effecting complete conversion of the aluminosilicate glass matrix material to a highly crystalline glass-ceramic matrix wherein anorthite constitutes the principal crystalline phase.

The product of the above-described procedure is a glass-ceramic matrix composite article exhibiting a high level of strength and toughness and very uniform fiber distribution in the matrix. More specifically, the physical properties observed are at least equivalent to those of composites of equivalent composition and structure made by more difficult prior art composite fabrication procedures.

As noted above, a further important feature attending the use of thermoplastic vehicle formulations in accordance with the invention is the facility with which the impregnated fiber tow, cloth, or other prepreg material may be reformed. The advantage of this feature is well illustrated by an embodiment of the invention wherein the selected inorganic fiber reinforcement material comprises a multiplicity of fiber tows. After impregnation with the ceramic matrix dispersion as above described, these tows are aligned or collimated and brought into contact to provide a prepreg configuration such as a collimated tape or a twisted or braided rope or cord. Thereafter, but prior to the step of consolidating the combined fiber reinforcement and ceramic matrix materials into a dense composite article, the tows are thermally fused together at a temperature above the melting temperature of the thermoplastic binder to provide a unitary prepreg assembly.

prepregs produced as described, whether in the form of a flexible collimated tape or other extended shape, may include a large number of the originally impregnated reinforcing fiber tows in any predetermined arrangement within the unitary assembly. Nevertheless the desirable uniform distribution of reinforcing fibers within the dispersion of ceramic matrix material and thermoplastic binder is retained.

The fabrication of a ceramic matrix composite article in accordance with this embodiment of the invention is more fully shown by the following illustrative example.

Example III

A ceramic matrix composite article is fabricated from a multiplicity of fiber tows impregnated as hereinabove described by reforming the impregnated tows into a collimated tape. Segments of the tape are then stacked to form an assembly which is subsequently consolidated into a dense composite article.

The collimated tape used to provide the assembly is produced from prepreg fiber tow produced in accordance with Example II above, by processing the tows though an appropriate thermal reforming procedure. Sixteen spools of the prepreg fiber tow are placed on a creel and the yarn ends from the spools are collected and pulled at a transport rate of about 4 ft/min through combs to provide parallel end alignment. The collimated yarn ends, in contact with each other, are then sandwiched between two sheets of release paper and the sandwiched array is brought into contact with a heating platen which softens the thermoplastic binder therein. The heating platen is maintained at a temperature of about 120° C.

While in contact with the platen, the array passes beneath a squeeze roller which causes the softened prepreg tows to flow together and form a collimated tape. The tape thus formed is then passed through a set of pinch rollers to adjust tape thickness, and the tape is then contacted with a chill plate maintained at a temperature of about 7° C. to set the thermoplastic binder.

Finally, one sheet of release paper is removed and the collimated tape is wound flat on a take-up spool. The tape produced by this process has a width of about 1.75 inches and a thickness of about 0.010 inches.

Collimated tape produced as described is cut into sections and stacked to form a composite preform wherein all of the fibers are substantially parallel-aligned. This preform is processed through a binder removal heat treatment schedule comprising heating the prepreg to a temperature of approximately 550° C. in a nitrogen atmosphere. Thereafter, the prepreg is hot pressed to a peak temperature of about 1340° C. at an applied pressure of 1500 psi to achieve final consolidation.

The product of this consolidation is a dense silicon carbide reinforced glass-ceramic composite material wherein anorthite constitutes the principal crystal phase. The material has a density of about 2.72 grams/cc and a room temperature microcrack yield stress of approximately 40.3 ksi. The ultimate strength of the composite in the strong (fiber) axis of the material is approximately 117.8 ksi. The microcrack yield stress of the material at 1300° C. is 9.1 Ksi, with an ultimate strength at this temperature of about 76.5 ksi.

Of course the foregoing examples are merely illustrative of materials and procedures which will be practiced by those skilled in the art within the scope of the appended claims.

We claim:

1. In the method for making a fiber-reinforced ceramic matrix composite comprising the steps of (i) combining inorganic reinforcing fibers with a liquid dispersion of a powder of a ceramic matrix material and (ii) consolidating the combination of fibers and ceramic matrix material into a unitary composite by the application of heat and pressure thereto, the improvement wherein the dispersion of powder of ceramic matrix material is solid at room temperature and is combined with the fibers as a heated liquid, and the dispersion comprises a thermoplastic vehicle constituent having a composition which comprises 10–40% by weight of at least one thermoplastic organic polymer component, 35–90% of at least one wax component, at least 60% by weight of thermoplastic polymer and wax components, and 0–40% by weight of surface active dispersants and polymeric plasticizers.

2. A method in accordance with claim 1 wherein the thermoplastic dispersion is substantially free of water and organic solvents, and wherein the dispersion is solidified by cooling without volatilization of dispersion constituents after combination with the inorganic fibers.

3. A method for making a fiber-reinforced ceramic matrix composite article comprising the steps of applying a dispersion of a powdered ceramic matrix material to an inorganic fiber reinforcement material and consolidating the combined fiber reinforcement and ceramic matrix materials by the application of heat and pressure thereto to provide a dense composite article, wherein:

(i) the dispersion of powdered ceramic matrix material comprises a powdered ceramic constituent and a thermoplastic vehicle constituent;

(ii) the thermoplastic vehicle constituent has a composition which comprises 10–40% by weight of at least one thermoplastic organic polymer component, 35–90% of at least one wax component, at least 60% by weight of thermoplastic polymer and wax components, and 0–40% by weight of surface active dispersants and polymeric plasticizers;

(iii) the dispersion is solid at room temperature and has a melting temperature below the thermal decomposition temperature of the thermoplastic vehicle constituent; and (iv) the dispersion is applied to the inorganic fiber reinforcement material in melted liquid form.

4. A method for making a fiber-reinforced ceramic matrix composite article in accordance with claim 3 wherein the inorganic fiber reinforcement material is a woven or non-woven fiber fabric.

5. A method for making a fiber-reinforced ceramic matrix composite article in accordance with claim 3 wherein the inorganic fiber reinforcement material comprises one or a multiplicity of inorganic fiber tows.

6. A method for making a fiber-reinforced ceramic matrix composite article in accordance with claim 5 wherein the inorganic fiber reinforcement material comprises a fiber two and wherein, after the dispersion is applied to the fiber tow but prior to the removal of the thermoplastic vehicle constituent, the fiber tow with the applied dispersion is fused with other fiber tows to provide a unitary flexible tape sheet or cord.

7. A powder dispersion for the manufacture of a fiber-reinforced ceramic matrix composite which comprises a powdered ceramic matrix material dispersed in an organic vehicle, wherein the organic vehicle is a thermoplastic organic vehicle which is a solid at room temperature, wherein the thermoplastic organic vehicle has a composition which comprises 10–40% by weight of at least one thermoplastic organic polymer component, 35–90% of at least one wax component, at least 60% by weight of thermoplastic polymer and wax components, and 0–40% by weight of surface active dispersants and polymeric plasticizers, and wherein the ceramic powder dispersion can be heated to a flowable liquid at a temperature below the thermal decomposition temperature of the organic vehicle.

8. A powder dispersion in accordance with claim 7 wherein the powdered ceramic matrix material is selected from the group consisting of glasses, thermally crystallizable glasses, and crystalline ceramics.

9. A powder dispersion in accordance with claim 8 wherein the thermoplastic organic vehicle comprises 10–40% by weight of at least one thermoplastic organic polymer component, 35–90% by weight of at least one low-melting volatile wax component, a total of at least 60% by weight of organic thermoplastic polymer and low-melting volatile wax components, and 0–40% by weight of additional components selected from the group consisting of surface-active dispersants, polymeric plasticizers, monolaurate waxes and fatty ketone waxes.

10. A preform for a fiber-reinforced ceramic composite article which comprises a matrix phase comprising a dispersion of a powdered ceramic material in a solid thermoplastic organic vehicle and a reinforcing phase distributed in the matrix consisting of a multiplicity of inorganic fibers, wherein the solid thermoplastic organic vehicle has a composition which comprises 10–40% by weight of at least one thermoplastic organic polymer component, 35–90% of at least one wax component, at least 60% by weight of thermoplastic polymer and wax components, and 0–40% by weight of surface active dispersants and polymeric plasticizers.

11. A preform in accordance with claim 10 wherein the powdered ceramic material is selected from the group consisting of powdered glass, powdered thermally crystallizable glass, and powdered crystalline ceramic.

12. A preform in accordance with claim 11 wherein the solid thermoplastic organic vehicle comprises at least 35% by weight of a wax and is vaporizable by heating in an inert atmosphere without the formation of significant carbon residue.

13. A preform in accordance with claim 12 wherein the inorganic fibers are selected from the group consisting of silicon carbide fibers and mullite fibers.

14. A preform in accordance with claim 13 wherein the thermoplastic organic vehicle comprises 10–40% by weight of at least one thermoplastic organic polymer component, 35–90% by weight of at least one low-melting volatile wax component, a total of at least 60% by weight of organic thermoplastic polymer and low-melting volatile wax components, and 0–40% by weight of additional components selected from the group consisting of surface-active dispersants, polymeric plasticizers, monolaurate waxes and fatty ketone waxes.

* * * * *